July 20, 1926.
A. KILLIAN
AWNING FOR VEHICLES
Filed July 21, 1925
1,593,178
2 Sheets-Sheet 1
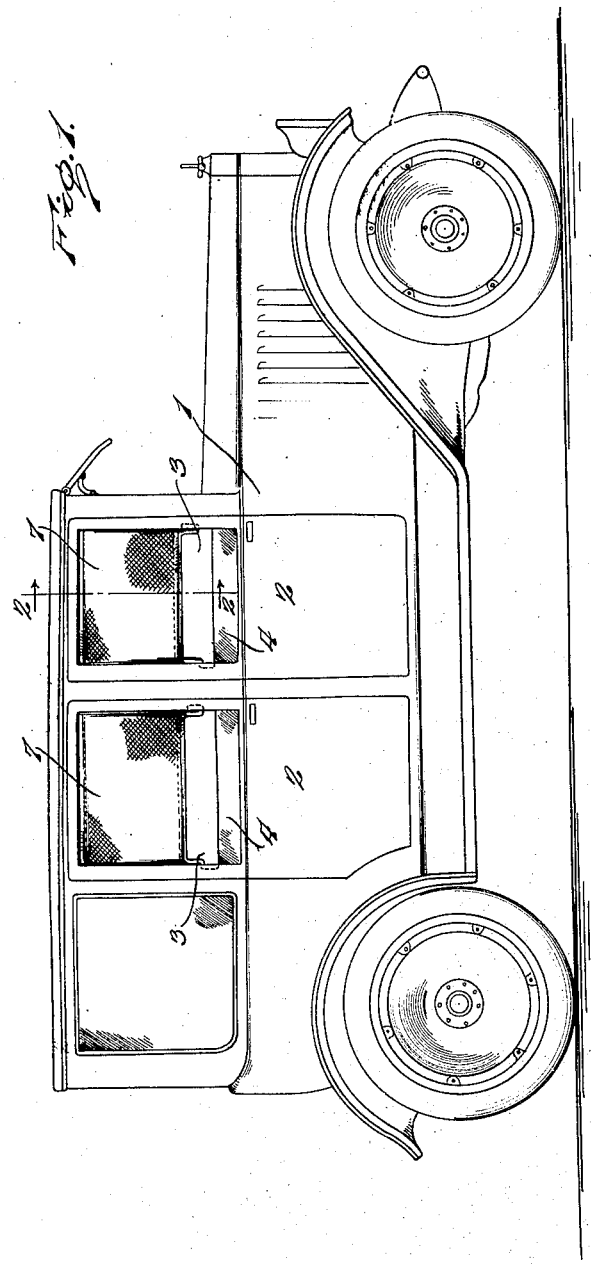
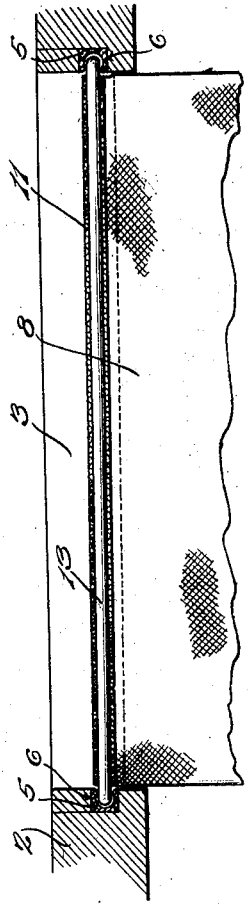
Inventor
A. Killian
By Lacy & Lacy, Attorneys July 20, 1926.  
A. KILLIAN  
AWNING FOR VEHICLES  
Filed July 21, 1925  
1,593,178  
2 Sheets-Sheet 2
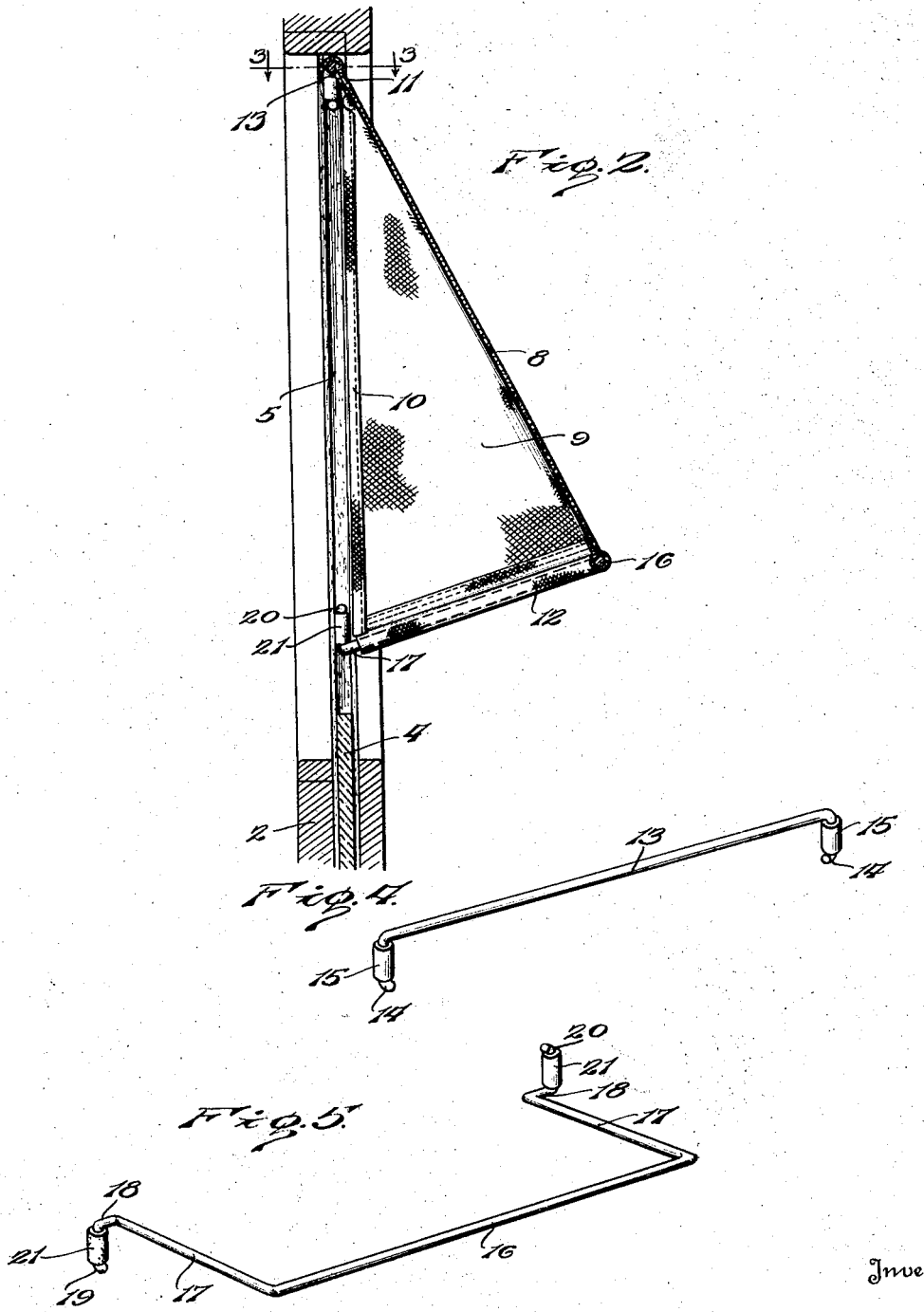
Inventor  
A. Killian  
By  Lacy & Lacy,  Attorneys Patented July 20, 1926.

1,593,178

UNITED STATES PATENT OFFICE.

ALBERT KILLIAN, OF MIDDLETOWN, PENNSYLVANIA.

AWNING FOR VEHICLES.

Application filed July 21, 1925. Serial No. 45,031.

This invention relates to an awning intended for use upon automobiles and other vehicles having window openings adapted to be closed by panels which slide vertically in tracks at the sides of the window openings and move downwardly when slid to open position. While the awning is illustrated in the accompanying drawings as applied to an automobile, it will be understood that it may also be used in connection with other vehicles, such as street cars and the like, or if so desired could be used in connection with the window openings of buildings.

One object of the invention is to so construct the awning that it may be very easily and quickly put in place or removed and to further so construct it that when in place it will be very firmly held and prevented from accidentally working loose.

Another object of the invention is to so construct the awning that when mounted it may extend outwardly from the window opening so that the occupants of the vehicle will be protected from the glare of the sun and rain and snow prevented from passing into an open window.

Another object of the invention is to so construct the awning that when removed it may be folded into a compact mass and stored in a small space.

This invention is illustrated in the accompanying drawings, wherein—

Figure 1 is a view showing an automobile in side elevation and having the improved awnings applied thereto;

Fig. 2 is a vertical sectional view taken on the line 2—2 of Fig. 1;

Fig. 3 is a sectional view taken on the line 3—3 of Fig. 2;

Fig. 4 is a perspective view of a yoke which holds the upper end of the awning in engagement with the window frame, and Fig. 5 is a perspective view of the lower yoke.

As previously explained, the awning has been illustrated applied to an automobile which is indicated in general by the numeral 1 and provided with doors 2, each of which has its upper portion formed with a window opening 3 adapted to be closed by a panel 4 formed of glass and movable vertically in tracks 5 at the sides of the window opening from the lowered or open position shown in Fig. 1 to a raised or closed position. The tracks 5 are in the form of channel strips which are disposed at the sides of the window openings and embedded in grooves 6, as shown in Fig. 3.

The awnings, which are indicated in general by the numeral 7, are of a duplicate construction and each is provided with a body portion 8 which is formed of flexible material so that it can be folded into a compact mass. Rubberized cloth of the type generally used when making side curtains of an automobile is preferably employed, but it will be understood that any desired material may be made use of which will serve to exclude sun light and also be waterproof. The body portion 8 is of a length to extend from the upper edge of the window opening outwardly from the door and have its lower edge spaced from the lower edge of the window opening is sufficient distance to permit the occupants of the automobile to see through the window opening without the sun having an opportunity to shine into the interior of the automobile or rain being permitted of being driven into the automobile through the window opening. The side portions of the body 8 are extended to provide side walls 9 which are triangular in shape, as shown in Fig. 2. Seams 10 are formed along the free edges of the side walls 9 so that raw edges will not be presented along the free edges of the side walls. Seams 11 and 12 are also formed along the upper and lower edges of the body, but these seams are deeper than the seams 10 and constitute pockets in which are mounted the yokes shown in Figs. 4 and 5.

The upper yoke 13 is formed from a rod of resilient metal which extends through the seam 11 and has its end portions extending beyond the sides of the body and bent to provide depending fingers 14 which are adapted to fit into the tracks 5. The extreme free ends of the fingers 14 are turned inwardly, as clearly shown in Fig. 4, so that, when the awning is in place, the free ends of the fingers will not catch and prevent easy insertion or removal of the fingers from the tracks. It should be noted that each finger is covered by a sleeve 15 formed of rubber or other compressible material to effect a tight frictional engagement with the tracks. The lower yoke which is shown in Fig. 5 and indicated by the numeral 16 is also formed from a rod of resilient metal.

The rod from which the yoke 16 is formed is bent at points intermediate its length to form arms 17 which are disposed in the portions of the lower seam or pocket 12 which extend across the lower ends of the side walls 9, and these arms 17 have their end portions extended beyond the free edges of the side walls and bent outwardly, as shown at 18, and then bent to provide fingers 19 and 20. The fingers 19 and 20 are disposed vertically so that they may fit into the tracks 5 and carry sleeves 21 similar to the sleeves 15 so that a tight binding action will take place and the fingers 19 and 20 retained in firm binding engagement with the tracks. It should be noted that the fingers 19 and 20 extend in opposite directions, as clearly shown in Fig. 5 and indicated by dotted lines in Fig. 1. By having the finger 19 extending downwardly and the finger 20 upwardly, the yoke will be braced against accidental tilting movement in a very efficient manner when the awning is in use and in addition this arrangement of fingers permits the lower yoke to be tilted when first disposed in the window opening and then swung into a horizontal plane with the fingers firmly seated in the tracks.

When it is desired to admit air to the interior of the automobile, the glass panel 4 is lowered to approximately the position shown in Fig. 1. Ordinarily this leaves the window open from the top and if it is raining or snowing the rain or snow will be driven into the automobile through the open window. In order to prevent the rain or snow from being driven into the automobile and also in order to prevent sun shine from entering the automobile on hot days, the awnings will be put in place and when in use will be disposed, as shown in Figs. 1 and 2, so that they allow a free circulation of air through the automobile but will serve very effectively to prevent sun shine and rain or snow from entering the automobile. When put in place, the upper yoke is first inserted with the finger at one end at the upper end of the track at that side of the window and the other finger extended into the track at the other side of the window in spaced relation to the upper edge of the window. Pressure is then applied adjacent the lower end of the yoke so that the lower end is forced upwardly and the yoke extends along the upper edge of the window opening. The lower yoke is then swung into place with one finger extending into its track at a greater distance from the lower edge of the window opening than the other finger. The elevated end portion of the yoke is then forced downwardly and if necessary the finger at the other side of the yoke also moved vertically until the lower yoke is disposed as shown in Fig. 2. When so mounted, the fingers will have tight binding engagement with the tracks, this being assisted by the fact that the rods from which the yokes are formed are resilient. Therefore, the awning will be very firmly held in place and will not be liable to accidentally work loose. When it is desired to remove the awnings so that the panels 4 may be moved upwardly to a closed position, the lower yoke is removed by first swinging the side provided with the finger 19 upwardly until the lower yoke is so tilted that it may be readily swung outwardly from the window opening. The upper yoke is then drawn downwardly at one end until it is tilted to such a position that both of its fingers are free from engagement with the tracks. The awning can then be folded into a compact mass and stored in a small space.

Having thus described the invention, I claim:—

1. An awning comprising a body adapted to fit within a window opening provided with tracks at its sides to slidably mount a closure for the window opening, and yokes at the upper and lower ends of said body formed of strips of resilient material having their ends extending beyond the sides of the body and bent to form vertically extending fingers adapted to fit into the tracks and frictionally grip the side wall of the window opening to removably retain the awning in place, the yoke at the lower end of said body having its fingers extending in opposite directions.

2. An awning comprising a body adapted to fit within a window opening provided with tracks at its sides to slidably mount a closure for the window opening, and yokes at the upper and lower ends of said body formed of strips of resilient material having their ends extending beyond the sides of the body and bent to form vertically extending fingers adapted to fit into the tracks and frictionally grip the side wall of the window opening to removably retain the awning in place, the yoke at the upper end of said body having its fingers extending in the same direction and the yoke at the lower end of the body having its fingers extending one upwardly and the other downwardly.

3. An awning comprising a body adapted to fit within a window opening provided with tracks at its sides to slidably mount a closure for the window opening, said body being formed of flexible material and having side walls increasing in depth towards their lower ends, pockets extending across the upper and lower ends of said body, the lower pocket being extended along the lower ends of said side walls, yokes of resilient rod metal disposed in said pockets, the upper yoke being straight for the major portion of its length and having its end portions extended out of the upper pocket and bent to form vertically disposed fingers and the lower yoke being U-shaped and having its arms extending across the lower ends of the walls and projecting from the ends of the lower pocket and bent to form fingers extending transversely from the side walls and terminating vertically extending portions, the fingers of said upper and lower yokes being adapted to fit into said tracks and frictionally hold the awning in the window opening.

In testimony whereof I affix my signature.

ALBERT KILLIAN. [L. S.]